United States Patent
Bartram

(10) Patent No.: US 11,941,441 B2
(45) Date of Patent: Mar. 26, 2024

(54) DATA MOVEMENT AND MONITORING SYSTEM

(71) Applicant: Capital One Services, LLC, McLean, VA (US)

(72) Inventor: Christian Bartram, Orlando, FL (US)

(73) Assignee: Capital One Services, LLC, McLean, VA (US)

( * ) Notice: Subject to any disclaimer, the term of this patent is extended or adjusted under 35 U.S.C. 154(b) by 421 days.

(21) Appl. No.: 17/231,454

(22) Filed: Apr. 15, 2021

(65) Prior Publication Data

US 2022/0334873 A1 Oct. 20, 2022

(51) Int. Cl.
*G06F 9/54* (2006.01)
*G06F 9/48* (2006.01)
*G06F 16/22* (2019.01)

(52) U.S. Cl.
CPC ........ *G06F 9/4887* (2013.01); *G06F 16/2282* (2019.01)

(58) Field of Classification Search
CPC ...... G06F 1/329; G06F 9/4843; G06F 9/4881; G06F 9/4887
See application file for complete search history.

(56) References Cited

U.S. PATENT DOCUMENTS

| | | | |
|---|---|---|---|
| 10,541,930 B2 | 1/2020 | Braddy et al. | |
| 10,921,991 B1* | 2/2021 | Olson | G06F 3/0619 |
| 11,138,536 B1* | 10/2021 | Yara | G06Q 10/06313 |
| 2020/0026710 A1 | 1/2020 | Przada et al. | |
| 2020/0167323 A1 | 5/2020 | Swamy et al. | |

FOREIGN PATENT DOCUMENTS

| | | |
|---|---|---|
| CN | 107301113 A | 10/2017 |
| CN | 105589874 B | 3/2019 |
| CN | 112015798 A | 12/2020 |

* cited by examiner

*Primary Examiner* — Andy Ho
(74) *Attorney, Agent, or Firm* — Sterne, Kessler, Goldstein & Fox P.L.L.C.

(57) ABSTRACT

Disclosed herein are various embodiments for a data movement and monitoring system. A variety of embodiments operate by determining a move time and a run time associated with a job configured to move a set of data from a table of a first system to one or more tables of a second system. A job deadline is calculated, and it is determined that a job is delayed based on the job deadline being prior to the current time and an absence of the set of data from a status table that indicates which data has been moved from the first system to the second system. A record in the status table is updated to indicate the job is delayed, and a notification that the job is delayed is provided to the one or more accounts.

20 Claims, 4 Drawing Sheets

| Job 112 | Table Name 202 | Schema Name 204 | Frequency 114 | Move Date 216 | PDate 206 | Deadline 119 |
|---|---|---|---|---|---|---|
| 102 | T_1 | S_1 | FIXED_DAY_OF_MONTH | 15 | PDATE | 12:00+840 |
| 235 | T_2 | S_2 | MONDAY-SATURDAY | | PDATE | 12:00+840 |
| 444 | T_3 | S_3 | ALL_DAYS | | PDATE -1 | 6:30+100 |
| 167 | T_4 | S_4 | BI_MONTHLY | 1/10, 3/10, 5/10 | PDATE | 04:15+840 |
| 093 | T_5 | S_5 | ALL_DAYS_EXCEPT_SUNDAY | | PDATE | 20:40+820 |
| 112 | T_3, T_6, T_7 | S_6 | QUARTERLY | FEB\|LAST_TUESDAY | PDATE | 12:00+840 |

210

FIG. 2

DATA MOVEMENT AND MONITORING SYSTEM

TECHNICAL FIELD

This application is generally directed to managing and monitoring data movement between different computing systems.

BACKGROUND

When an organization is upgrading its data storage systems, it may need to move its data from an original computing system where the data is currently stored to an upgraded computing system with different processing capabilities. For example, the organization may move their data from an in-house computing system to a third party system, such as a cloud service provider who will provide data storage and hosting services. Using the cloud may enable the organization to both optimize data processing and reduce maintenance costs.

However data movement often cannot be completed in a single step because of both the volume of data that needs to be moved, and because existing systems of the organization may not have yet been updated and may still be producing data on the original computing system (as opposed to the cloud system). This new data may then need to be periodically moved from the in-house system to the cloud system.

However, as with any computing jobs, there can be delays or failures. These delays or failures may become problematic when others are relying on data reports or data processing that are generated based on the assumption that the new data was moved in a timely manner. With existing systems, it is often difficult or impossible to know whether the data used to produce the data report or perform the data processing was using the most up to date and timely moved data.

BRIEF DESCRIPTION OF THE DRAWINGS

The accompanying drawings are incorporated herein and form a part of the specification.

FIG. 2 illustrates a schedule, according to some example embodiments.

In the drawings, like reference numbers generally indicate identical or similar elements. Additionally, generally, the left-most digit(s) of a reference number identifies the drawing in which the reference number first appears.

SUMMARY

Figure 1:
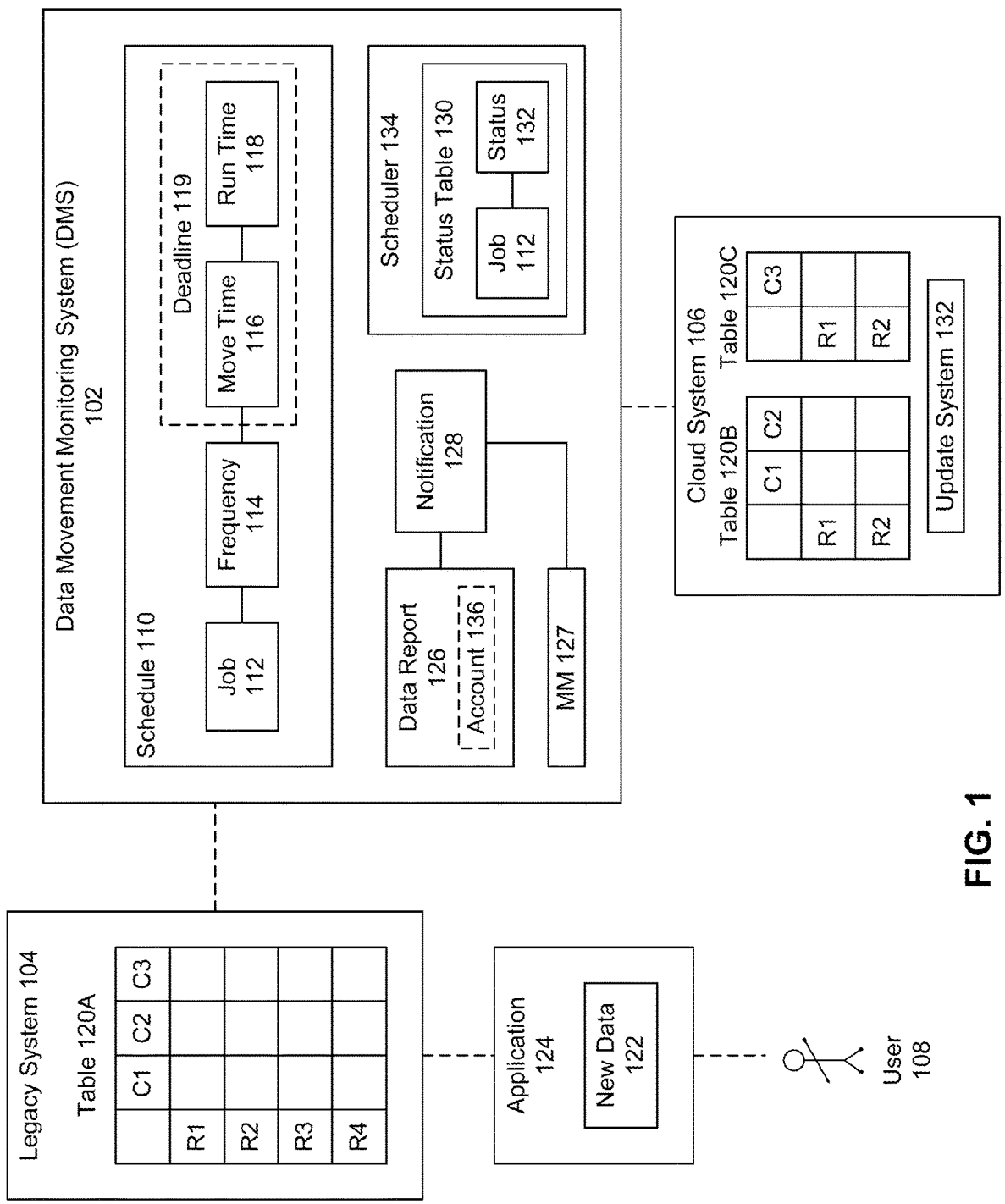
FIG. 1 is a block diagram illustrating example functionality for providing a data movement monitoring system (DMS), according to some embodiments.

Provided herein are system, apparatus, article of manufacture, tangible computer-readable medium, method and/or computer program product embodiments, and/or combinations and sub-combinations thereof, for providing a data movement monitoring system.

In some embodiments, a computer-implemented method operates by determining a move time and a run time associated with a job configured to move a set of data from a table of a first system to one or more tables of a second system. A job deadline is calculated, and it is determined that a job is delayed based on the job deadline being prior to the current time and an absence of the set of data from a status table that indicates which data has been moved from the first system to the second system. A record in the status table is updated to indicate the job is delayed, and a notification that the job is delayed is provided to the one or more accounts.

In some embodiments, a system including a memory and a processor coupled to the memory performs operations including determining a move time and a run time associated with a job configured to move a set of data from a table of a first system to one or more tables of a second system. A job deadline is calculated, and it is determined that a job is delayed based on the job deadline being prior to the current time and an absence of the set of data from a status table that indicates which data has been moved from the first system to the second system. A record in the status table is updated to indicate the job is delayed, and a notification that the job is delayed is provided to the one or more accounts.

In some embodiments, a tangible computer-readable medium having instructions stored thereon that, when executed by at least one computing device, causes the at least one computing device to perform operations including determining a move time and a run time associated with a job configured to move a set of data from a table of a first system to one or more tables of a second system. A job deadline is calculated, and it is determined that a job is delayed based on the job deadline being prior to the current time and an absence of the set of data from a status table that indicates which data has been moved from the first system to the second system. A record in the status table is updated to indicate the job is delayed, and a notification that the job is delayed is provided to the one or more accounts.

DETAILED DESCRIPTION

Provided herein are system, apparatus, device, method and/or computer program product embodiments, and/or combinations and sub-combinations thereof, for providing a data movement and monitoring system.

When an organization is upgrading its data storage systems, it may need to move its data from an original computing system where the data is currently stored to an upgraded computing system with different processing capabilities. For example, the organization may move their data from an in-house computing system to third party system, such as a cloud service provider who will provide data storage and hosting services. Using the cloud may enable the organization to both optimize data processing and reduce maintenance costs.

Data movement often cannot be completed in a single step because of both the volume of data that needs to be moved, and because existing systems of the organization may not have yet been updated and may still be producing data on the original computing system (as opposed to the cloud system). This new data may then need to be periodically moved from the in-house system to the cloud system.

However, as with any computing job, there can be delays or failures. These delays or failures may become problematic when others are relying on data reports or data processing that are generated based on the assumption that the new data being was moved in a timely manner. With existing systems, it is often difficult or impossible to know whether the data used to produce the data report or perform the data processing was using the most up to date and timely moved data.

FIG. 1 is a block diagram 100 illustrating example functionality for providing a data movement monitoring system (DMS) 102, according to some embodiments. DMS 102 may monitor, track, and/or manage the movement of data from a legacy system 104 to a cloud system 106. DMS 102 may provide or make available real-time updates, on the status of various data movement jobs 112 that have been scheduled, to users 108 who may be relying that the data is moved in accordance with the schedule.

While data movement delays often occur in data movement systems, DMS 102 provides notifications 128 to the responsible or affected accounts, systems, or users 108 who may be adversely affected or otherwise impacted directly or indirectly by the delays. For example, a sales manager (e.g., user 108) may receive a monthly report (data report 126) about the status of various deals the sales team is handling.

Newly generated sales data may be moved from legacy system 104 to cloud system 106 on a weekly basis according to schedule 110. The data report 126 may be generated off of the data from the cloud system 106 and/or may assume that the status and updates as submitted by the sales team for the previous month has been moved to the cloud system 106 according to schedule 110.

If the sales data was not moved as scheduled or prior when the sales report is generated, the sales manager 108 may be looking at erroneous data, which could lead to making poor or costly business decisions. As such, DMS 102 may monitor the movement of the sales data, and provide the sales manager 108 with a notification 128 if the sales data has been delayed, indicating that the data report 126 may not be accurate. In some embodiments, DMS 102 may also push back the time when the data report 126 is generated until after the delayed jobs 112 impacting the data report 126 have been completed.

In an embodiment, a user 108 may schedule one or more data movement jobs, which may be stored by DMS 102 in a schedule 110. The user 108 may refer to an account, one or more user IDs, or a role responsible for generating, maintaining, or moving the data between legacy system 104 to cloud system 106. In some embodiments, user 108 may be a user or system that is receives data report 126 or is otherwise relying on the one or more data movement jobs 112 being completed according to schedule 110.

Legacy system 104 may include a current computing system or database where data is currently stored. In some embodiments, the data of legacy system 104 may be stored across one or more tables 120A. In some embodiments, legacy system 104 may include an in-house or locally maintained computing system. In some embodiments, legacy system 104 may include a third party data storage provider.

Cloud system 106 may include any target system where the data from legacy system 104 is to be moved. Moving data from a legacy (non-cloud environment) to a cloud system 106 is only an example embodiment. In some embodiments, legacy system 104 may include a first cloud service provider and cloud system 106 may include a second cloud service provider. In some embodiments, neither legacy system 104 nor cloud system 106 may include cloud services, however cloud system 106 may include computing capabilities or processes that are determined to be more suitable for storing or managing data than legacy system 104.

The schedule 110 may indicate when data is to be moved from legacy system 104 to cloud system 106. In some embodiments, schedule 110 may include any storage structure. For example, schedule 110 may be stored as a single static CSV (comma separated values) file. For the sake of simplicity, legacy system 104 illustrates on a single table 120A. However, it is understood that legacy system 104 may include thousands of different tables of data organized across one or more databases or database servers.

In some embodiments, one or more computing applications 124 may be configured to generate and store new data 122 on legacy system 104. In some embodiments, the historical or previously created data may have been moved from legacy system 104 to cloud system 106. However, an organization may include thousands of users using a variety of applications 124 to generate new data 122. It takes resources such as time, money, and personnel to reconfigure those applications 124 or retrain users 108 to store data on cloud system 106. During this period of time, a user 108 may schedule data movement jobs 112 for moving the new data 122 (and/or historical data) from legacy system 104 to cloud system 106 in accordance with schedule 110.

Each job 112 may be associated with a particular table 120A or one or more queries (executed across one or more tables 120A) of legacy system 104. Each job may also include various lines of code for data transformations that are to be performed on the data copied from legacy system 104 before it is copied, inserted, pasted, or moved to cloud system 106.

In some embodiments, a job 112 may include an ETL (extract, transform, and load) job, which may include hundreds or thousands of lines of SQL (structured query language) code that is used to restructure and move the data. For example, as illustrated in FIG. 1, data stored in a single table 120A in legacy system 104 may be stored across multiple tables 120B, 120C in cloud system 106. Other example data transformations may include adding information, removing information, changing units of measurement, or converting the data to new data types (e.g., such as integer to string). The data transformation may also include various aggregations or calculations performed on the data, which may be stored with or in lieu of the data copied from legacy system 104.

In some embodiments, schedule 110 may include an identifier for job 112, frequency 114, move time 116, and run time 118. In some embodiments, schedule 110 may include additional or other information including but not limited to, requester information (about a user 108 or account who requested or created the job), priority information (about the job relative to other jobs), host information (indicating the tables or computing devices of legacy system 104 from which data is retrieved), a pointer to SQL code or indication as to which data transformations are to be performed, and destination information (indicating across which tables or other data locations the moved data is to be stored when moved to cloud system 106).

In some embodiments, the scheduling functionality may be used to move both previously created data that is stored in legacy system 104, and new data 122 which may be generated or retrieved by one or more applications 124 that are configured to produce this data in table 120A (or across multiple tables) of legacy system 104.

In some embodiments, some of the jobs 112 may be repeatedly or periodically executed, as indicated by frequency 114. This may enable new data 122 that is being generated and stored in legacy system 104 by one or more applications 124 that have not been configured or updated to generate, stored, or provide this data directly to cloud system 106 to be moved to cloud system 106. Examples of frequency 114 may be hourly, daily, monthly, every 15.5 hours, on a specific day of each month or week, etc.

Each job 112 may include one or more of a move time 116 and a run time 118. Move time 116 may be a date/time indicating when the job 112 is scheduled to begin. For example, a job 112 may be scheduled to be run weekly (frequency 114), and its move time 116 may be Tuesday, 14:00 (2:00 p.m. in 12 hour format).

Run time 118 may be a length of time approximated to execute the job 112 or may indicate a time when data report 126 or user 108 expects the job to be completed. The run time may be based on any number of factors, including, but not limited to, the amount of data being moved by the job 112, the time of day, the network or processing capacity available, and the number or type of data transformations to be performed on the data as part of the job. In some embodiments, run time 118 may be set by a user 108 familiar with the data or who requested or set up the job 112, because that user 108 may have the best ability to approximate the run time 112. In some embodiments, the run time 118 may be adjusted or set by DMS 102 based on tracking the time that was required to execute previous jobs that were similar in data volume and/or data transformation complexity.

In some embodiments, DMS 102 may calculate a deadline 119 for the job based on the move time 116 and run time 118. For example, the move time plus the run time may be the deadline 119. In the example above, the move time 116 may be Tuesday, 14:00 and the run time 118 may be 120 minutes. As such the deadline 119 may be Tuesday, 16:00 (14:00+120 minutes). If the job 112 has not completed executing by Tuesday, 16:00, then DMS 102 may mark the job as delayed in status table 130 and/or send a notification 128 to one or more users 108 who may be relying on a timely move of the data by the deadline 119.

Failures and/or delays can result from network issues, variance in schemas, SQL bugs, changing access control lists, and application level code changes. Notifications 128 may indicate when delays are identified and/or success and failure notifications.

In some embodiments, a system or computing process may be relying on the movement of data in accordance with schedule. For example, a machine learning model (MM) 127 may be executed in real time whenever a customer performs a new bank transaction. The data used by MM 127 may be loaded monthly (e.g., frequency 114) into a table called T2_STMT in cloud system 106 that contains monthly bank transactions for each customer's account. MM 127 may incrementally train itself on the new data in the T2_STMT table to learn about each user's spending and saving habits. When the data movement of the customer's previous transaction data is delayed, without a notification system in place, MM 127 may become corrupted and begin making inaccurate predictions. This could adversely impact how a company budgets or otherwise allocates resources, services or even charges a client including recommending various products or services to the client. In some embodiments, DMS 102 may send a notification 128 to MM 127 which may cause MM 127 to pause until the relied upon data movement job 112 is completed (as may be indicated by a subsequent notification 128).

In some embodiments, DMS 102 may listen to or receive messages from update system 132 to determine the status of jobs 112. In some embodiments, update system 132 may provide notifications or messages indicating data has been successfully moved to cloud system 106. DMS 102 may cross-reference the successfully moved data notifications with the jobs 112 and/or generate or update a status table 130 indicating the statuses of the various jobs 112. In some embodiments, update system 132 may also provide communications if a job or data movement fails or if a job is in progress, and when a job was started/completed. DMS 102 may receive these updates and store them in a status table 130.

In some embodiments, DMS 102 may generate and update status table 130 based on both job identifiers (from schedule 110) and status information (from update system 132). This may enable DMS 102 to provide real-time tracking of information regarding which jobs were successful (on time), successful (delayed), currently delayed, and failed. A user 108 may either login and see the status 132 of various jobs 112 in status table 130 and/or receive notifications 128 with status updates.

In some embodiments, each table 120A (or group of tables or rows) may have or be associated with a service level agreement (SLA) that outlines when, how often, and what data is to be moved from legacy system 104 to cloud system 106. In some embodiments, the SLA requirements may be extracted and stored in schedule 110, as job 112, frequency 114, move time 116, and run time 118 information. In some embodiments, the move time 116 may be in either computer readable or human readable format. For example, move time 116 may be in an HH:mm format, where HH is the hour (in 24 hour format) and the mm is the minute when the data is to be moved.

The run time 118 may enable the system to generate or calculate a move window when the data is expected to be moved. Sometimes a job 112 can take multiple hours to just load the table 120A because of a large amount of data, so run time 118 may account for this volume of data that needs to be loaded (and then transformed). In some embodiments, run time 118 may be provided in hours and minutes, in minutes, or as a specific deadline 119 date/time (in the HH:mm format). In some embodiments, if run time 118 is provided in a minutes format, this may be added to the move time 116 to calculate the move window or deadline 119.

As noted above, DMS 102 may identify a move time 116, when the table is expected to be loaded or begin loading or moving from legacy system 104 to cloud system 106. Run time 118 may be an expected run time (ERT) or how long the job is expected to take before its status 128 can be marked 'delayed' in status table 130.

In some embodiments, DMS 102 may also identify a production date (PDate) when the data was produced or expected to be produced. The PDate is often different from move time 116 because the data must be produced and available before it can be moved. However, there may be times when data production is delayed. In determining whether a data movement job 112 is delayed, DMS 102 may account for the PDate and if the PDate is after the move time 116 or deadline 119, this may be cause for an extension in which case the status 132 may not be delayed and/or may be delayed with an indication it was a data production delay that caused the delay. This status update may be reflected in status table 130 and may cause DMS 102 to provide a data production delay notification 128.

A scheduler 134 may a computing process that is configured to update status table 130. In some embodiments, scheduler 134 may be or include a lambda function component that executes on cloud system 106 to determine which data has been moved from update system 132. In some embodiments, rather than operating continuously (which may be a waste of computing resources), scheduler 134 may periodically execute (e.g., check for updates or messages from update system 132 which may be available) and update status table 130 accordingly.

For example, scheduler 134 may execute every 60 minutes. In the example above, a job 112 which may be performed weekly (frequency 114), may include a move time of Tuesday, 12:00 and a run time of 120 minutes, from which DMS 102 may calculate a deadline 119 of Tuesday at 14:00 (2:00 p.m.). If the scheduler 134 is executing on a Tuesday at 11:01 a.m., even though the data may not have been moved yet, the job 112 would not be marked as delayed in status table 130 because the move time is not until 12:00 p.m.

When the scheduler 134 executes at 12:01 p.m., this is after the move time 116 but before the deadline 119 of 2:00 p.m., so even if the data has not been moved, DMS 102 would not mark the job 112 as delayed in status table 130. The same thing happens at 1:01 p.m. However, at 2:01 p.m., if update system 132 has not yet provided a completion update with regard to the job 112 or the status 132 for the job 1112 is empty or waiting completion, the status 132 may be marked as delayed. In some embodiments, scheduler 134 may be configured to skip checking on job 112 until after deadline 119 (2:00 p.m. on Tuesday) and may check on other jobs whose deadlines 119 have already passed.

Upon this update of status 132 to delayed (after 2:01 p.m.), DMS 102 may identify a system process or data report 126 that may be relying on the data from the table(s) 120B, 120C where the job data was to be moved. DMS 102 may identify one or more accounts 136 (e.g., user IDs, telephone numbers, email addresses, chat handles, social media handles, etc.) associated with the identified computing process or data report 126 and send a notification 128 to the account 136. As noted above, DMS 102 may also send a delay notification 128 to a process that is supposed to execute based on the data that was scheduled to be moved but is now identified as being delayed.

The notification 128 may be an indication that the job 112 has been delayed. The notification 128 may indicate which tables were affected by the delay in legacy system 104 and/or cloud system 106 (e.g., tables 120A, 120B, 120C), the move time 116 of the job, the deadline 119 of the job, the identified computing process or data report 126 which may be affected by the delay and/or any other relevant information.

In continuing the example above, if a message is received from update system 132 at 2:45 p.m., the status 132 of the job 112 may be changed to "completed-delayed" and an updated notification 128 indicating the job has completed may be transmit in the form of a social media post, telephone call, text message, or email, which may be received at a user account 136 or at a user device (e.g., laptop, phone, etc).

In some embodiments, the completion may not be detected by scheduler until its next execution at 3:01 p.m. So, for example, even if the job 112 completed at 2:45 p.m., scheduler 134 may not become aware of the completion until 3:01 p.m., at which point the status 132 of status table 130 may be updated to "completed-delayed" and one or more corresponding notifications 128 may be transmitted to whichever systems and/or users 108 who may have received the delay notification 128.

FIG. 2 illustrates a schedule 210, according to some example embodiments. The schedule 210 may include job identifier column 112. The job identifiers may include any alphanumeric identifiers which are either provided by a user or system generated. The table name 202 may indicate the name of one or more tables of legacy system 104 from which data is received or copied for the job. In some embodiments, the table name 202 may identify a query that is executed against the one or more tables. Schema name 204 may identify one or more schemas associated with the identified tables 202.

As noted above, frequency 114 may indicate how often or when the particular job is executed. In the example illustrated, move date 216 may be an additional qualifier that is provided with some jobs and not others. The move date 216 value may provide additional information when the actual day (e.g., of the week or month) is not clear from frequency 114. For example, move date 216 may indicate when, which day, the data of the job is to be moved, which may depend on the frequency 114. For example, job 444 is run every day, so no additional move date 216 is required.

However, in cases when frequency 114 may include a range of days, move date 216 may be necessary. For example, job 102 is executed on a fixed day of each month. That could include any day of the month. As such, the move date 216 specifies the value 15, indicating the data is moved on the $15^{th}$ of each month. Deadline 119 may include both the move time 116 and run time 118. In some embodiments, deadline 119 may include a final time value. For example, job 444 indicates a deadline 119 of 6:30+100 minutes. In some embodiments, job 444 may include a deadline 119 value of 8:10 (a.m.).

As noted above Pdate 206 may be used to determine if a delay message or late message or notification 128 needs to be sent. Pdate 206 may the date that data was generated and may be in the format of Pdate or Pdate-x, in which x is a value greater than zero that indicates how many days prior to the expected run date the data was generated. For example, −3 may indicate that the data was produced three days prior to the expected run date. −x may be used when the data is produced and the moved on separate days. This is to make sure the move is not improperly marked as delayed or late.

In some embodiments, for job 444, the Pdate indicates that the data is to be produced the day before (−1). However, if at 8:11 a.m., the status table 130 indicates that job 444 has not yet been marked as completed, DMS 102 may check the Pdate for the data. If, for example, there was a delay in producing or generating the data that was scheduled to be moved, this may cause an extension to be provided before the job can be marked as delayed. For example, if at 6:30 a.m., the data was still not produced, a notification 128 may be sent to one or more users 108 informing them of a data production delay and a possible (likely) resulting data movement delay for job 444.

In some embodiments, if a particular Table A has a frequency 114 of ALL_DAYS, which means the job is expected to run seven days a week. The table A has a PDate 206 of PDate meaning that the data is produced daily on the same day as it is moved. Table A has a move window of 12:00+840. It is expected to run at noon, and has a buffer time of 840 minutes, which is the equivalent of 14 hours, which is 2:00 a.m. the following day. So on January $1^{st}$, the move time 116 is at 12:00 p.m., and the system has until 2:00 a.m. the following morning (on January $2^{nd}$) to complete its job (e.g., the deadline 119). The latest move for this table may have occurred on December $31^{st}$ at 7:00 a.m., as indicated by status table 130.

If the scheduler 134 is executing at 11:00 a.m. on January 1, DMS 102 may identify the last time the job was expected to be completed (e.g., a previous deadline 119). For the January 1 move, the deadline 119 is not until 2:00 a.m. on January $2^{nd}$, so that job cannot be marked as delayed yet. Subtracting a day, the previous expected deadline 119 was at 2:00 a.m. on January $1^{st}$ (for the December $31^{st}$ expected move). DMS 102 may then check the status table 130 to determine if and when the December 31$^{st}$ completed, and send back notification 128 with a status update. If the December 31$^{st}$ move has not yet completed, DMS 102 may continue going back each day (as determined by frequency 114) and check table to identify when the last successful move was completed. The statuses 132 for each of the daily jobs 112 may then be updated in status table 130 accordingly, and one or more notifications 128 transmit.

Figure 3:
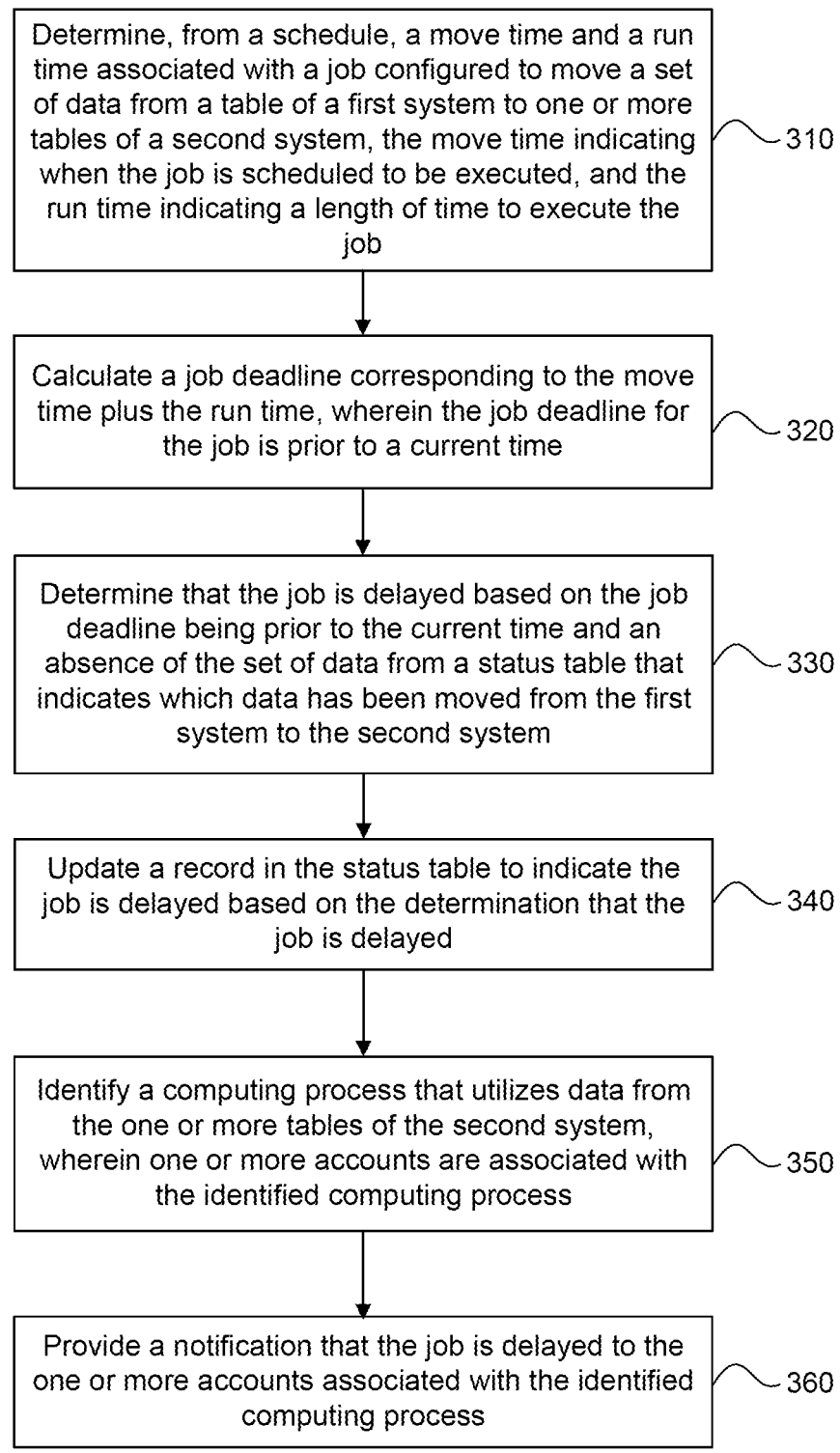
FIG. 3 is a flowchart illustrating example operations for providing a data movement and monitoring system, according to some embodiments.

FIG. 3 is a flowchart 300 illustrating example operations for providing a data movement and monitoring system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Without limiting method 300, method 300 is described with reference to elements in FIG. 1.

At 310, a move time and a run time associated with a job configured to move a set of data from a table of a first system to one or more tables of a second system are determined from a schedule, the move time indicating when the job is scheduled to be executed, and the run time indicating a length of time to execute the job. For example, schedule 110 may include one or more jobs 112 corresponding to when data is to be moved from legacy system 104 to cloud system 106. The schedule 110 may include both a move time 116 and run time 118.

At 320, a job deadline corresponding to the move time plus the run time is calculated. For example, deadline 119 may be calculated by adding the run time 118 to the move time 116. When the scheduler 134 executes, it may only check those jobs for which the job deadline 119 for the job is prior to a current time. If the job deadline 119 is after the current time, then the job cannot be marked as delayed yet.

At 330, it is determined that the job is delayed based on the job deadline being prior to the current time and an absence of the set of data from a status table that indicates which data has been moved from the first system to the second system. For example, scheduler 134 may periodically execute, and if the execution time is after deadline 119, and the status 134 for the job 112 of status table 130 has not been marked as completed, scheduler 134 may determine the job is delayed.

At 340, a record in the status table is updated to indicate the job is delayed based on the determination that the job is delayed. For example, based on current or execution time of the scheduler 134 being after deadline 119 (and where the data has already been produced as indicated by a Pdate 206), scheduler 134 may update the status 134 to be delayed.

At 350, a computing process that utilizes data from the one or more tables of the second system is identified. For example, in some embodiments, schedule 110 may indicate which system processes or data report 126 depend on the job 112 or the destination tables of cloud system 106 where the data is being moved. In some embodiments, schedule 110 may also include an identification of one or more user accounts 136 that are associated with the data, or that need to be notified in case of delays.

At 360, a notification that the job is delayed is provided to the one or more accounts associated with the identified computing process. For example, DMS 102 may send a notification 128 in the form of an email, text message, automated phone call, or other electronic communications one or more users 108 or accounts 136 informing them of data movement failures, data production delays, data movement delays, and when delayed jobs have successfully completed.

Figure 4:
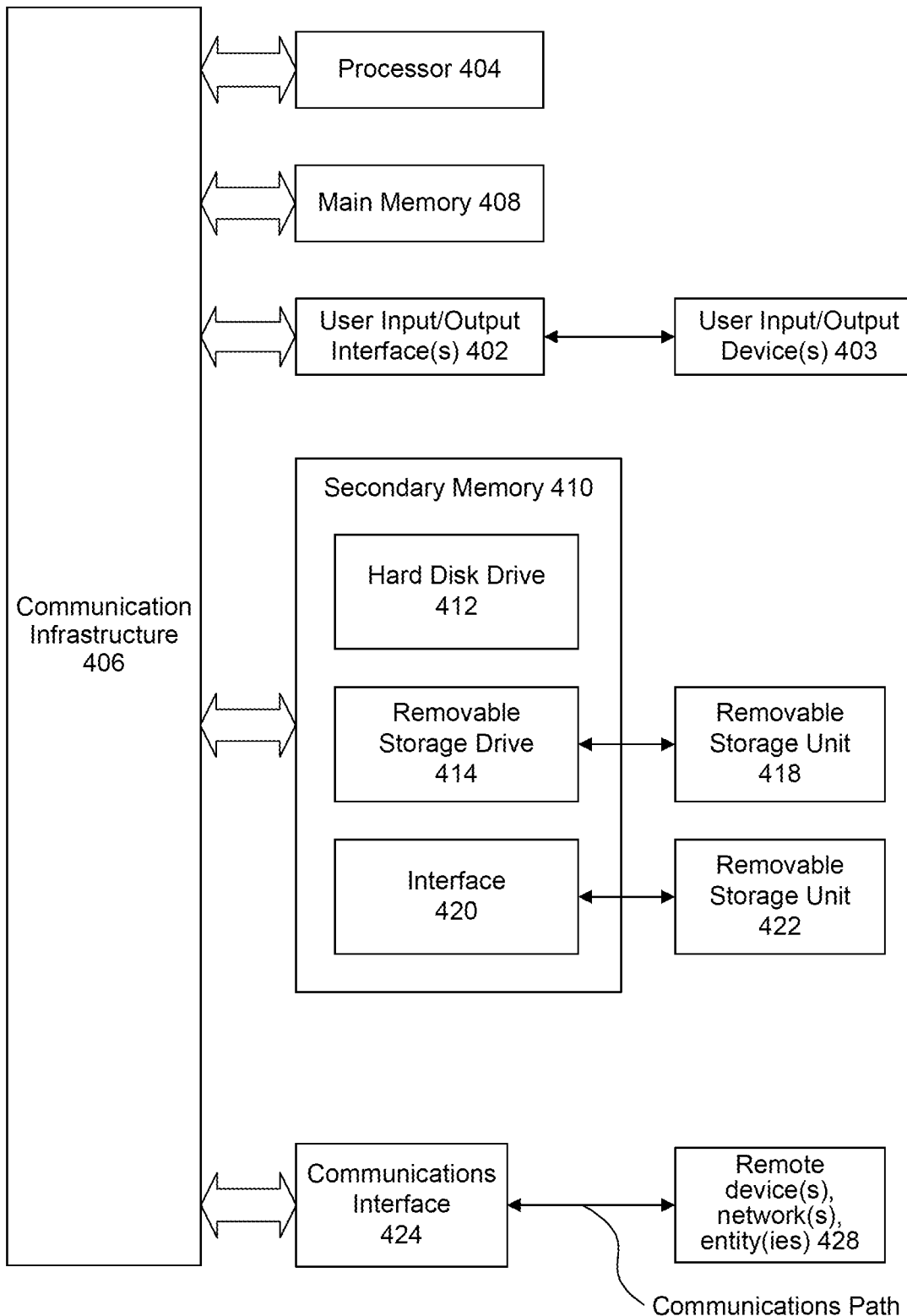
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In some embodiments, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments and should be defined only in accordance with the following claims and their equivalents.

What is claimed is:

1. A computer-implemented method, comprising:
   determining, from a schedule, a move time and a run time associated with a job configured to move a set of data from a table of a first system to one or more tables of a second system, the move time indicating when the job is scheduled to be executed, and the run time indicating a length of time to execute the job;
   calculating a job deadline corresponding to the move time plus the run time, wherein the job deadline for the job is prior to a current time;
   determining that the job is delayed based on the job deadline being prior to the current time and an absence of the set of data from a status table that indicates which data has been moved from the first system to the second system;
   updating a record in the status table to indicate the job is delayed based on the determination that the job is delayed;

identifying a computing process that utilizes data from the one or more tables of the second system, wherein one or more accounts are associated with the identified computing process; and providing a notification that the job is delayed to the one or more accounts associated with the identified computing process.

2. The method of claim 1, wherein the first system comprises a local computing environment and wherein the second system comprises a cloud computing environment configured to load the set of data into one or more cloud hosted tables.

3. The method of claim 1, further comprising:

determining that the set of data was moved from the first system to the second system after the job deadline but before the current time, wherein the identified computing process was scheduled to execute after the job deadline but before the current time.

4. The method of claim 3, wherein the updating comprises:

updating the record to indicate that movement of the set of data from the first system to the second system was moved after the job deadline but before the current time; and providing the notification, to the one or more accounts associated with the identified computing process, that the job completed after the job deadline.

5. The method of claim 1, wherein the run time is set by a user associated with at least one of the one or more accounts.

6. The method of claim 1, further comprising:

identifying a production time associated with the set of data associated with the job, the production time indicating when the set of data was produced; and determining that the production time of the set of data associated with the job was after the move time, wherein when the production time is after the move time, an extension time is applied before the record in the status table is updated as delayed.

7. The method of claim 6, further comprising:

calculating the extension time comprising a difference between the production time and the move time; and calculating the job deadline corresponding to the move time plus the run time plus the extension time.

8. A system, comprising:

a memory; and at least one processor coupled to the memory and configured to perform operations comprising:

determining, from a schedule, a move time and a run time associated with a job configured to move a set of data from a table of a first system to one or more tables of a second system, the move time indicating when the job is scheduled to be executed, and the run time indicating a length of time to execute the job;

calculating a job deadline corresponding to the move time plus the run time, wherein the job deadline for the job is prior to a current time;

determining that the job is delayed based on the job deadline being prior to the current time and an absence of the set of data from a status table that indicates which data has been moved from the first system to the second system;

updating a record in the status table to indicate the job is delayed based on the determination that the job is delayed;

identifying a computing process that utilizes data from the one or more tables of the second system, wherein one or more accounts are associated with the identified computing process; and providing a notification that the job is delayed to the one or more accounts associated with the identified computing process.

9. The system of claim 8, wherein the first system comprises a local computing environment and wherein the second system comprises a cloud computing environment configured to load the set of data into one or more cloud hosted tables.

10. The system of claim 8, the operations further comprising:

determining that the set of data was moved from the first system to the second system after the job deadline but before the current time, wherein the identified computing process was scheduled to execute after the job deadline but before the current time.

11. The system of claim 10, wherein the updating comprises:

updating the record to indicate that movement of the set of data from the first system to the second system was moved after the job deadline but before the current time; and providing the notification, to the one or more accounts associated with the identified computing process, that the job completed after the job deadline.

12. The system of claim 8, wherein the run time is set by a user associated with at least one of the one or more accounts.

13. The system of claim 8, the operations further comprising:

identifying a production time associated with the set of data associated with the job, the production time indicating when the set of data was produced; and determining that the production time of the set of data associated with the job was after the move time, wherein when the production time is after the move time, an extension time is applied before the record in the status table is updated as delayed.

14. The system of claim 13, the operations further comprising:

calculating the extension time comprising a difference between the production time and the move time; and calculating the job deadline corresponding to the move time plus the run time plus the extension time.

15. A non-transitory computer-readable medium having instructions stored thereon that, when executed by at least one computing device, cause the at least one computing device to perform operations comprising:

determining, from a schedule, a move time and a run time associated with a job configured to move a set of data from a table of a first system to one or more tables of a second system, the move time indicating when the job is scheduled to be executed, and the run time indicating a length of time to execute the job;

calculating a job deadline corresponding to the move time plus the run time, wherein the job deadline for the job is prior to a current time;

determining that the job is delayed based on the job deadline being prior to the current time and an absence of the set of data from a status table that indicates which data has been moved from the first system to the second system;

updating a record in the status table to indicate the job is delayed based on the determination that the job is delayed;

identifying a computing process that utilizes data from the one or more tables of the second system, wherein one or more accounts are associated with the identified computing process; and providing a notification that the job is delayed to the one or more accounts associated with the identified computing process.

16. The non-transitory computer-readable medium of claim 15, wherein the first system comprises a local computing environment and wherein the second system comprises a cloud computing environment configured to load the set of data into one or more cloud hosted tables.

17. The non-transitory computer-readable medium of claim 15, the operations further comprising:
determining that the set of data was moved from the first system to the second system after the job deadline but before the current time, wherein the identified computing process was scheduled to execute after the job deadline but before the current time.

18. The non-transitory computer-readable medium of claim 17, wherein the updating comprises:
updating the record to indicate that movement of the set of data from the first system to the second system was moved after the job deadline but before the current time; and providing the notification, to the one or more accounts associated with the identified computing process, that the job completed after the job deadline.

19. The non-transitory computer-readable medium of claim 15, wherein the run time is set by a user associated with at least one of the one or more accounts.

20. The non-transitory computer-readable medium of claim 15, the operations further comprising:
identifying
a production time associated with the set of data associated with the job, the production time indicating when the set of data was produced; and determining that the production time of the set of data associated with the job was after the move time, wherein when the production time is after the move time, an extension time is applied before the record in the status table is updated as delayed.

* * * * *